United States Patent
Delin et al.

(10) Patent No.: US 11,977,179 B2
(45) Date of Patent: May 7, 2024

(54) LEAKAGE DETECTION SYSTEM AND METHOD

(71) Applicant: Rosemount Tank Radar AB, Mölnlycke (SE)

(72) Inventors: Håkan Delin, Linköping (SE); Urban Blomberg, Linköping (SE); Lars-Ove Larsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 366 days.

(21) Appl. No.: 17/440,969

(22) PCT Filed: Mar. 26, 2019

(86) PCT No.: PCT/EP2019/057550
§ 371 (c)(1),
(2) Date: Sep. 20, 2021

(87) PCT Pub. No.: WO2020/192893
PCT Pub. Date: Oct. 1, 2020

(65) Prior Publication Data
US 2022/0163625 A1 May 26, 2022

(51) Int. Cl.
*G01S 7/35* (2006.01)
*G01S 13/34* (2006.01)
(Continued)

(52) U.S. Cl.
CPC .............. *G01S 7/356* (2021.05); *G01S 13/34* (2013.01); *G01S 13/38* (2013.01); *G01S 13/886* (2013.01)

(58) Field of Classification Search
CPC .......... G01S 7/356; G01S 13/34; G01S 13/38; G01S 13/886
See application file for complete search history.

(56) References Cited

U.S. PATENT DOCUMENTS

| 4,333,080 A | * | 6/1982 | Collins ................. G01S 13/282 |
| | | | 342/194 |
| 4,672,842 A | | 6/1987 | Hasselmann |

(Continued)

FOREIGN PATENT DOCUMENTS

| CN | 102401681 A | * | 4/2012 | ........... G01F 23/284 |
| CN | 106768732 | | 5/2017 | |

(Continued)

OTHER PUBLICATIONS

International Search Report and Written Opinion from PCT/EP2019/057550, dated Dec. 3, 2019.

(Continued)

*Primary Examiner* — Ladimir Magloire
*Assistant Examiner* — Maxine Mckenzie Phillips
(74) *Attorney, Agent, or Firm* — Westman, Champlin & Koehler, P.A.

(57) ABSTRACT

A method of detecting leakage, comprising the steps of: performing a sequence of monitoring operations; and providing, when it is determined that leakage is present, a signal indicative of detected leakage. Each monitoring operation includes the steps of: generating a transmit signal exhibiting a time-varying frequency; receiving a reflection signal resulting from reflection of the transmit signal at the surface; forming an intermediate frequency signal for the present monitoring operation based on the transmit signal and the reflection signal; determining a phase of the intermediate frequency signal for the present monitoring operation; determining, based on the phase for the present monitoring operation and the phase associated with at least one previous monitoring operation, a measure indicative of a present rate of change of the phase; comparing the measure with a predefined threshold value; and determining a presence of leakage based on the comparison.

12 Claims, 6 Drawing Sheets

(51) Int. Cl.
G01S 13/38 (2006.01)
G01S 13/88 (2006.01)

(56) References Cited

U.S. PATENT DOCUMENTS

| | | | | |
|---|---|---|---|---|
| 5,355,767 | A * | 10/1994 | Morita | F41G 3/14 |
| | | | | 342/419 |
| 6,590,520 | B1 * | 7/2003 | Steele | G01S 13/953 |
| | | | | 342/26 R |
| 2010/0175470 | A1 | 7/2010 | Schrier et al. | |
| 2013/0076559 | A1 | 3/2013 | Edvardsson | |
| 2014/0266863 | A1 * | 9/2014 | Larsson | G01S 7/023 |
| | | | | 342/124 |
| 2015/0233750 | A1 | 8/2015 | Malinovskiy | |
| 2018/0284758 | A1 * | 10/2018 | Cella | G06F 18/2178 |
| 2018/0372527 | A1 * | 12/2018 | Griessbaum | G01F 23/284 |

FOREIGN PATENT DOCUMENTS

| | | | | |
|---|---|---|---|---|
| DE | 102004023220 A1 * | 10/2005 | | H03L 7/16 |
| EP | 2 748 566 | 7/2017 | | |
| EP | 2 748 566 B1 | 11/2017 | | |
| JP | 2018124162 A * | 8/2018 | | |
| WO | WO 2013 044953 | 4/2013 | | |

OTHER PUBLICATIONS

"Alert Technologies", Technical Paper of ISA, Instrument of Society of America, by J. Crump, vol. 46, No. 2, Jan. 2, 1991, pp. 1187-1192.

* cited by examiner

LEAKAGE DETECTION SYSTEM AND METHOD

CROSS-REFERENCE TO RELATED APPLICATION

This Application is a Section 371 National Stage Application of International Application No. PCT/EP2019/057550, filed Mar. 26, 2019 and published as WO 2020/192893 on Oct. 1, 2020, in English, the contents of which are hereby incorporated by reference in their entirety.

TECHNICAL FIELD OF THE INVENTION

The present invention relates to a method of detecting leakage from a tank, and to a leakage detection system.

TECHNICAL BACKGROUND

Oil and other products are often stored in large storage tanks, which may be in tank farms or under ground etc.

If leakage should occur in such a storage tank, it is highly desirable to reliably detect such leakage as soon as possible to prevent environmental damage and waste of product.

For instance, crude oil storage tanks may have sizes of several hundred thousand cubic meters and a millimeter of product corresponds to several cubic meters of oil.

Known methods of detecting oil leakage from a storage tank include installing an oil-sensing cable below or around the storage tank. When oil reaches the cable, the leakage can be detected.

It would be desirable to provide for improved leakage detection, in particular faster leakage detection.

SUMMARY

In view of the above, a general object of the present invention is to provide for improved leakage detection, in particular faster leakage detection.

According to a first aspect of the present invention, it is therefore provided a method of detecting leakage from a tank containing a product, using a radar level gauge system comprising a transceiver, a propagation device coupled to the transceiver, and processing circuitry coupled to the transceiver, the method comprising the steps of: performing a sequence of monitoring operations, each monitoring operation including the steps of: generating, by the transceiver, an electromagnetic transmit signal exhibiting a time-varying frequency; propagating, by the propagation device, the transmit signal towards a surface of the product in the tank; returning, by the propagation device, an electromagnetic reflection signal resulting from reflection of the transmit signal at the surface back towards the transceiver; receiving, by the transceiver, the reflection signal; forming, by the transceiver, an intermediate frequency signal for the present monitoring operation based on the transmit signal and the reflection signal; determining, by the processing circuitry, a phase of the intermediate frequency signal for the present monitoring operation; determining, based on the phase of the intermediate frequency signal for the present monitoring operation and the phase of the intermediate frequency signal associated with at least one previous monitoring operation in the sequence of monitoring operations, a measure indicative of a present rate of change of the phase of the intermediate frequency signals for the sequence of monitoring operations; comparing the measure indicative of the present rate of change of the phase with a predefined threshold value; and determining a presence of leakage based on the comparison; and providing, when it is determined that leakage is present, a signal indicative of detected leakage.

Each monitoring operation may include storing the measure indicative of the present rate of change of the phase and/or a measure indicative of the phase of the intermediate frequency signal associated with the present monitoring operation. The measure indicative of the rate of change of the phase may, for example, be the rate of change of the level of the product in the tank.

The electromagnetic transmit signal may advantageously be a microwave signal. For instance, the transmit signal may be frequency and/or amplitude modulated on a carrier in the microwave frequency range.

The present invention is based on the realization that, while not being straight-forward to use for determining the absolute distance to the surface of the product (and thus the level of the product in the tank), the phase of the intermediate frequency signal in a radar level gauge system of the FMCW-type is highly suitable for accurately determining changes in the distance to the surface of the product. In particular, the present inventors have found that monitoring of changes over time in the phase of the intermediate frequency signal provides for a fast, accurate and reliable determination of even a very small change in filling level over time.

According to embodiments of the present invention, the above-mentioned phase of the intermediate frequency signal may be the phase at the frequency of the intermediate frequency signal for which a transported energy of the intermediate frequency signal exhibits its highest maximum. This phase may be determined based on per se known frequency analysis, such as FFT, of the intermediate frequency signal for each monitoring operation in the sequence of monitoring operations. Those of ordinary skill in the art will be aware that there are also other ways of determining the phase.

Through the fast, accurate and reliable indication of a rate of change of the level of the product in the tank achievable in embodiments of the present invention, the presence of leakage in the tank can be detected at an early stage, before a large quantity of product has leaked from the tank. Furthermore, the very short time needed to reliably detect an ongoing but very small lowering of the level in the tank may make the leakage detection method according to embodiments of the present invention relatively insensitive to variations in the temperature, in particular if it can be determined that any temperature variations exhibit a different behavior over time than the detected change in level.

According to embodiments, the present rate of change may be determined only based on the present monitoring operation, and previous monitoring operations carried out less than five minutes before the present monitoring operation. This may reduce the influence of temperature fluctuations on the determined present rate of change. To even further reduce the influence of temperature fluctuations, the present rate of change of the phase may be determined only based on the present monitoring operation, and previous monitoring operations carried out less than two minutes before the present monitoring operation.

According to various embodiments, furthermore, the method may additionally comprise the step of repeatedly acquiring a measure indicative of a rate of change of a temperature at the tank.

Such a measure may be acquired from a temperature sensor arranged inside the tank for best performance, or outside the tank, which may be more convenient.

In embodiments, the determination of the presence of leakage may be additionally based on the rate of change of the temperature at the tank. Based on an indication of the rate of change of the temperature of the product in the tank, the rate of change of the level indicated by the rate of change of the phase of the intermediate frequency signal may be corrected for temperature effects. Hereby, a more reliable leakage detection can be provided for.

Advantageously, the determination of the presence of leakage may be additionally based on the rate of change of the temperature at the tank as a function of time.

According to various embodiments, the determination of the presence of leakage may be additionally based on the phase of the intermediate signal as a function of time, or the rate of change of the phase of the intermediate signal as a function of time. Depending on factors such as the location and/or the configuration of the tank, a certain relation between temperature and time may be expected. For instance, the temperature may be expected to vary in 24-hour cycles for a storage tank arranged above ground. By monitoring the phase, or the rate of change of the phase over time, such cyclic behavior, for example, can be identified and compensated for. For example, present and future temperature influence can be predictively compensated for.

In embodiments, the determination of the presence of leakage may be based on the phase of the intermediate signal as a function of time, or the rate of change of the phase of the intermediate signal as a function of time over a period of time of at least 24 hours, or more preferably over a period of time of at least 48 hours.

Advantageously, furthermore, the monitoring operations may be carried out with an average frequency of at least one monitoring operation per second. With a higher measurement frequency, a sufficiently high confidence value can be achieved within a shorter time.

According to a second aspect of the present invention, it is provided a leakage detection system, for detecting leakage from a tank containing a product, the leakage detection system comprising: a propagation device for propagating an electromagnetic transmit signal towards a surface of the product in the tank, and returning an electromagnetic reflection signal resulting from reflection of the transmit signal at the surface of the product; a transceiver coupled to the propagation device for generating and providing to the propagation device the transmit signal exhibiting a time-varying frequency, receiving the reflection signal, and mixing the transmit signal and the reflection signal to form an intermediate frequency signal; and processing circuitry, coupled to the transceiver, and configured to: determine a phase of the intermediate frequency signal formed by the transceiver; determine, based on the phase of the intermediate frequency signal for a present monitoring operation and the phase of the intermediate frequency signal associated with at least one previous monitoring operation, a measure indicative of a present rate of change of the phase of the intermediate frequency signals for a sequence of monitoring operations; compare the measure indicative of the present rate of change of the phase with a predefined threshold value; determine a presence of leakage based on the comparison; and provide, when it is determined that leakage is present, a signal indicative of detected leakage.

The "transceiver" may be one functional unit capable of transmitting and receiving electromagnetic signals or may be a system comprising separate transmitter and receiver units.

It should be noted that the processing circuitry may be provided as one device or several devices working together.

The propagation device may be a radiating antenna, or a probe extending towards and into the product in the tank.

In summary, the present invention thus relates to a method of detecting leakage, comprising the steps of: performing a sequence of monitoring operations; and providing, when it is determined that leakage is present, a signal indicative of detected leakage. Each monitoring operation includes the steps of: generating a transmit signal exhibiting a time-varying frequency; receiving a reflection signal resulting from reflection of the transmit signal at the surface; forming an intermediate frequency signal for the present monitoring operation based on the transmit signal and the reflection signal; determining a phase of the intermediate frequency signal for the present monitoring operation; determining, based on the phase for the present monitoring operation and the phase associated with at least one previous monitoring operation, a measure indicative of a present rate of change of the phase; comparing the measure with a predefined threshold value; and determining a presence of leakage based on the comparison.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

Figure 1:
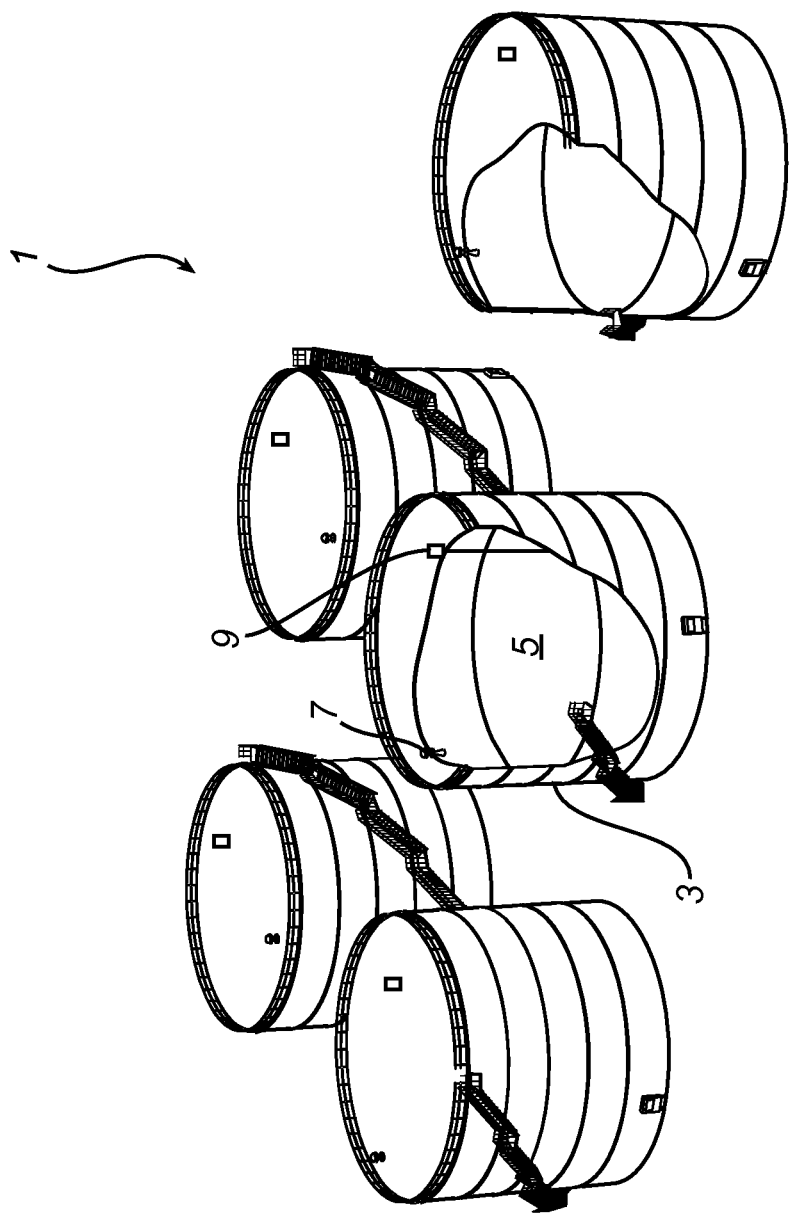
FIG. 1 schematically shows an application for embodiments of the leakage detection system and method according to the present invention, in the form of a tank farm.

FIG. 1 schematically shows an application for the leakage detection system and method according to the present invention, in the form of a tank farm 1, comprising a plurality of storage tanks 3 containing a product 5. In the example application of FIG. 1, each storage tank 3 is provided with a leakage detection system 7 according to an example embodiment of the present invention, and a separate temperature sensor 9. In FIG. 1, each leakage detection system 7 is a radar level gauge system with leakage detection capabilities, which may be controllable between a level determination mode and a leakage detection mode. In the level determination mode, the radar level gauge system 7 may determine the level of the product 5 in the tank 3 based on the frequency of the intermediate frequency signal, and in the leakage detection mode, the radar level gauge system 7 may determine the presence of leakage based on a rate of change of the phase of the intermediate frequency signal. The radar level gauge system 7 may be controllable to alternate between the level determination mode and the leakage detection mode.

Figure 2:
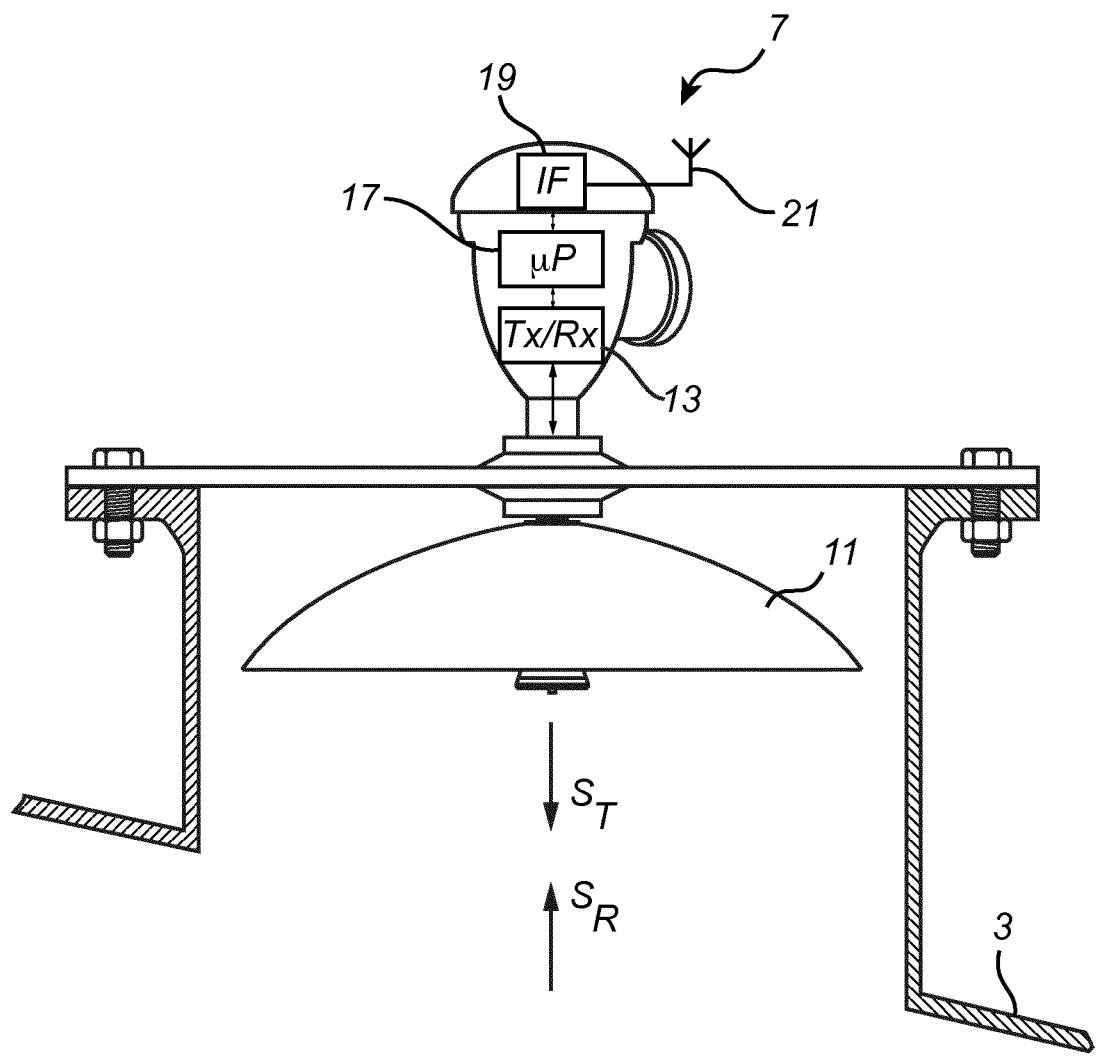
FIG. 2 is an enlarged view of an exemplary leakage detection system according to embodiments of the preset invention, schematically indicating functional parts of the leakage detection system.

FIG. 2 is an enlarged view of an exemplary leakage detection system 7 according to embodiments of the preset invention, schematically indicating functional parts of the leakage detection system 7. Referring to FIG. 2, the leakage detection system 7 comprises a propagation device, here in the form of a parabolic antenna 11, a transceiver 13, processing circuitry 17, a communication interface 19, and a communication antenna 21 for enabling wireless communication between the leakage detection system 7 and external unit, such as a control system (not shown) for the tank farm 1 in FIG. 1.

Under control of the processing circuitry 17, the transceiver 13 generates and transmits an electromagnetic transmit signal $S_T$ exhibiting a time-varying frequency (like a radar level gauge system of the Frequency Modulated Continuous Wave-type). The transmit signal $S_T$ is passed on from the transceiver 13 to the antenna 11, which radiates the transmit signal $S_T$ towards the product in the tank 3, as is schematically indicated in FIG. 2. The antenna returns an electromagnetic reflection signal $S_R$, resulting from reflection of the transmit signal $S_T$ at the surface of the product in the tank 3, to the transceiver 13. As will be described in greater detail further below, the transceiver 13 forms an intermediate frequency signal $S_{IF}$ based on the transmit signal $S_T$ and the reflection signal $S_R$. This intermediate frequency signal $S_{IF}$ is processed by the processing circuitry 17 to determine a phase P of the intermediate frequency signal $S_{IF}$. Based on a sequence of phase determinations, the rate of change of the phase $\phi$ can be estimated, which can in turn be used to detect a leakage. If a leakage is detected, a signal indicative thereof may be provided to a remote location, such as the above-mentioned control system, by means of the communication interface 19 and the communication antenna 21.

In the example embodiment of FIG. 2, the communication from/to the leakage detection system/radar level gauge system 7 is indicated as being wireless communication. Alternatively, communication may, for example, take place over an analog and/or digital wire-based communication channel. For instance, the communication channel may be a two-wire 4-20 mA loop and the filling level and/or leakage detection signal may be communicated by providing a certain current corresponding to the filling level on the two-wire 4-20 mA loop. Digital data may also be sent across such a 4-20 mA loop, using the HART protocol. Furthermore, pure digital communication protocols such as Modbus or Foundation Fieldbus may be used.

Figure 3:
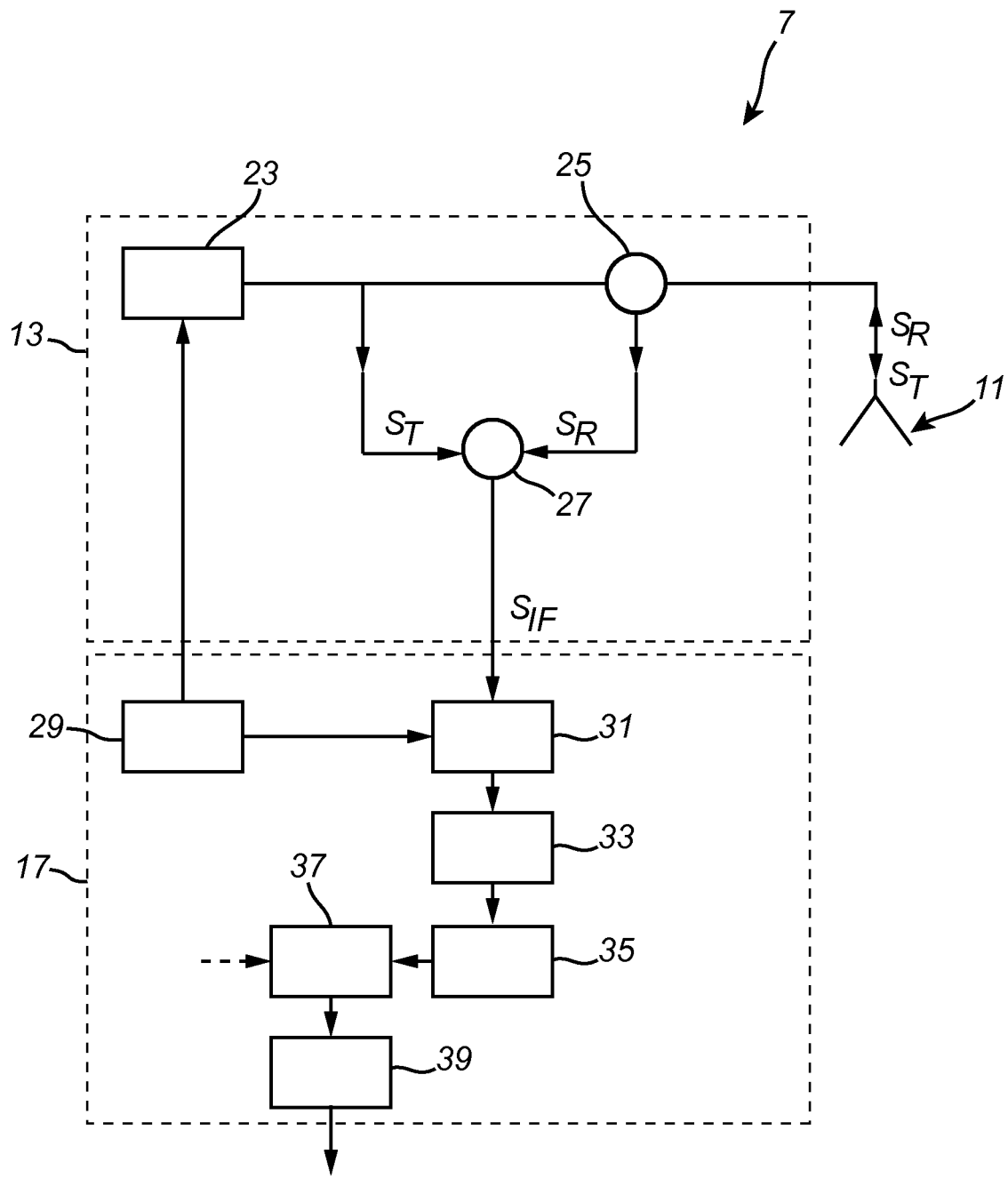
FIG. 3 is a partial schematic block diagram of the leakage detection system in FIG. 2.

FIG. 3 is a partial and simplified schematic block diagram of the leakage detection system 7 in FIG. 2. Referring to FIG. 2, the block diagram shows a measurement channel comprising the transceiver 13 and the processing circuitry 17 in FIG. 2.

The transceiver 13 is here shown as including a microwave source 23, a power divider 25, and a mixer 27. The processing circuitry 17 is shown as including timing circuitry 29, a sampler 31, an FFT block 33, a phase determining block 35, a memory 37, and a leakage determining block 39.

As is schematically indicated in FIG. 3, the timing circuitry 29 is coupled to the microwave source 23 to control the microwave source 23 to generate a transmit signal $S_T$. The microwave source 23 is connected to the antenna 11 via the power divider 25, and thus provides the transmit signal $S_T$ to the antenna 11. The reflection signal $S_R$ from the antenna 11 is routed by the power divider 25 to the mixer 27, which is also connected to receive the signal from the microwave source 23. The transmit signal $S_T$ provided by the microwave source 23 and the reflection signal $S_R$ from the antenna 11 are combined to form an intermediate frequency signal $S_{IF}$.

As is schematically shown in FIG. 3, the intermediate frequency signal $S_{IF}$ is sampled by the sampler 31, which may be controlled by the timing circuitry 29 to be synchronized with the transmit signal $S_T$. The sampled intermediate frequency signal $S_{IF}$ is further processed by the FFT-block 33 and the phase determining block 35 to determine the phase of the intermediate frequency signal $S_{IF}$. The phase is stored in the memory 37, optionally together with temperature data as is schematically indicated by the dashed arrow in FIG. 3. Based on the data stored in the memory 37, the leakage determining block 37 determines whether or not leakage is detected, and provides a signal indicating the result of the determination.

While the elements of the transceiver 13 are typically implemented in hardware, and form part of an integrated unit normally referred to as a microwave unit, at least some portions of the processing circuitry 17 may typically be embodied by software modules executed by an embedded processor. The invention is not restricted to this particular realization, and any implementation found suitable to realize the herein described functionality may be contemplated.

Figure 4:
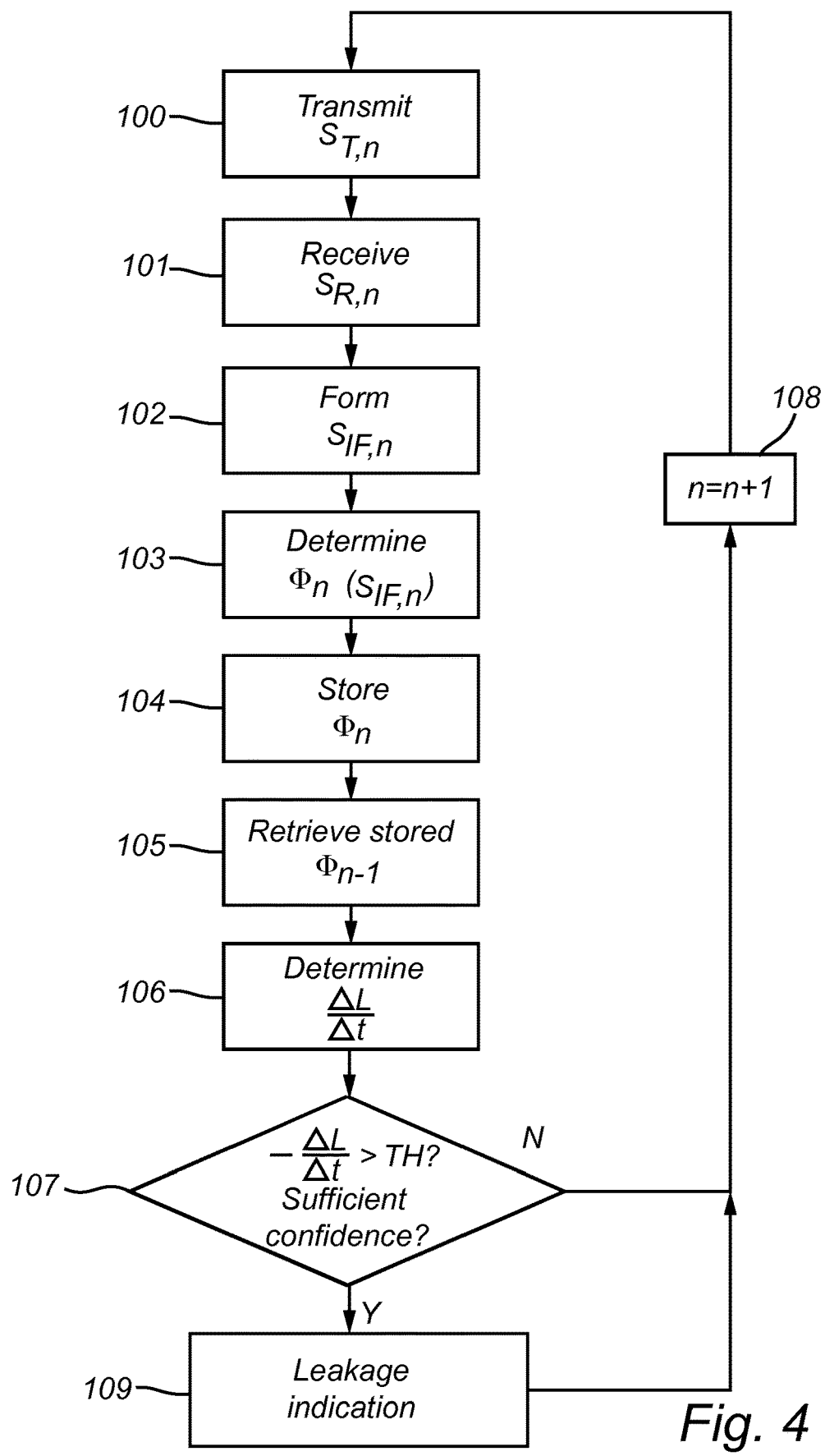
FIG. 4 is a flow-chart schematically illustrating an example embodiment of the method according to the present invention.
Figure 5A:
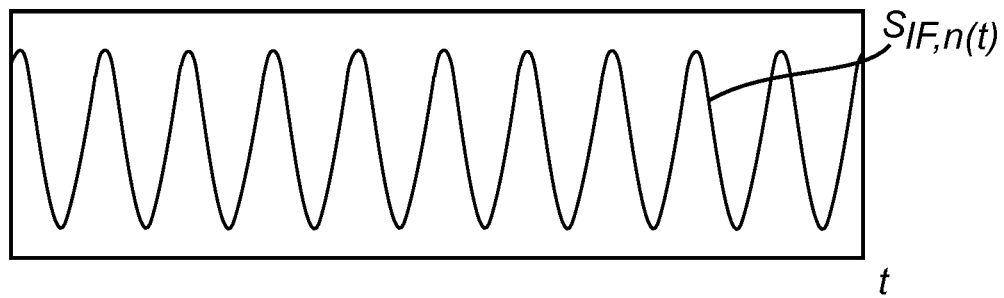
FIGS. 5A-C are diagrams illustrating steps of the method in FIG. 4.

An example embodiment of the method according to the present invention will now be described with reference to the flow-chart in FIG. 4. According to embodiments of the present invention, monitoring operations are carried out in sequence. In a first step 100, the transmit signal $S_{T,n}$ of monitoring operation number n in the sequence is generated and transmitted. The reflection signal $S_{R,n}$ resulting from reflection of the transmit signal $S_{T,n}$ at the surface of the product 5 in the tank 3 is received in step 101. In step 102, the transmit signal $S_{T,n}$ and the reflection signal $S_{R,n}$ are combined to form the so-called intermediate frequency signal $S_{IF,n}$ for the monitoring operation, using techniques that are per se well-known in the art of FMCW-type radar level gauge systems. An exemplary intermediate frequency signal $S_{IF,n}$ is shown, in the time domain, in FIG. 5A.

Figure 5B:
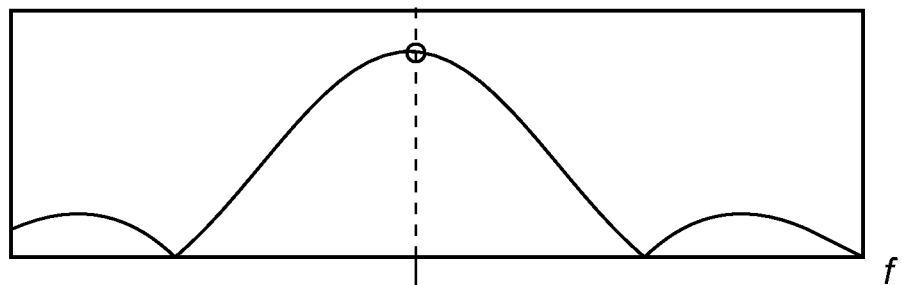
Figure 5C:
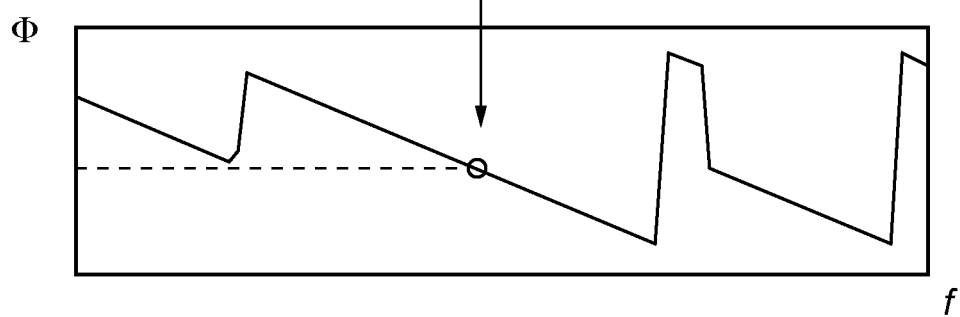

In the subsequent step 103, a phase $\phi_n$ of the intermediate frequency signal $S_{IF,n}$ for the present monitoring operation is formed based on the transmit signal $S_{T,n}$ and the reflection signal $S_{R,n}$ According to embodiments of the invention, this may be done by transforming the intermediate frequency signal $S_{IF,n}$ to the frequency domain, for example by means of the FFT-block 33 in FIG. 3, identifying the frequency corresponding to reflection at the surface 5 of the product (the frequency at which the intermediate frequency signal carries the largest amount of energy), and determining the phase $\phi_n$ of the intermediate frequency signal $S_{IF,n}$ for this frequency. This procedure is schematically illustrated by FIG. 5B, showing the energy carried by the intermediate frequency signal $S_{IF,n}$ as a function of frequency, and FIG. 5C, showing the phase as a function of frequency. It should be noted that FIG. 5B and FIG. 5C are zoomed in on a rather narrow frequency interval around the frequency of the intermediate frequency signal corresponding to reflection of the transmit signal at the surface of the product. The phase $\phi_n$ determined for the present monitoring operation is stored in memory 37 in step 104.

In the subsequent step 105, the phase $\phi_{n-1}$, $\phi_{n-2}$, ... of the intermediate frequency signal associated with at least one previous monitoring operation in the sequence of monitoring operations is retrieved from the memory 37. Thereafter, in step 106, a measure indicative of a present rate of change of the phase of the intermediate frequency signals for the sequence of monitoring operations is determined based on the present phase $O_n$ and the previous phase values $\phi_{n-1}$, $\phi_{n-2}$, ... retrieved from the memory 37 in step 105. In the example method illustrated in FIG. 4, the measure indicative of the present rate of change of the phase is represented by a present rate of change $(\Delta L/\Delta t)_n$ of the level of the product 5 in the tank 3.

Each monitoring operation in the sequence of monitoring operations may thus result in a present rate of change of the level of the product 5 in the tank 3. This is schematically indicated by the line 41 in FIG. 6.

Figure 6:
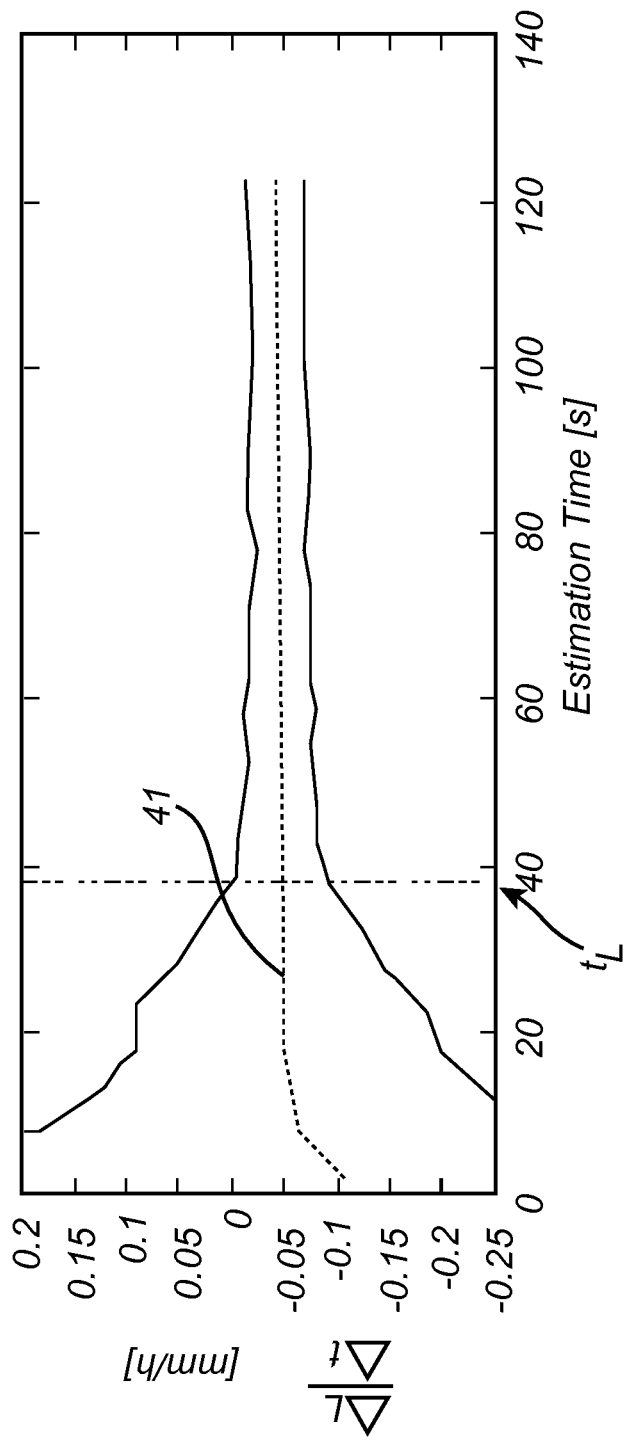
FIG. 6 is a diagram showing an example of an estimation of the rate of change of the level of the product achieved using an embodiment of the method according to the present invention.

In the subsequent step 107 the above-mentioned measure indicative of the present rate of change of the phase, here the present rate of change $(\Delta L/\Delta t)_n$ of the level, is compared with a predefined threshold value TH, and a presence of leakage is determined (estimated) based on the comparison. In the example of FIG. 6, the magnitude of the present rate of change of the level is determined, together with a confidence interval for the determination. For the example implementation of FIG. 6, leakage may be determined to be present when the present rate of change is determined to be negative (indicating a decreasing level) with a confidence of at least 99.7%. In the example of FIG. 6, this occurs within 40 s of the onset of the leakage, at the time $t_L$ indicated in FIG. 6. Before this time, the rate of change of the level is determined to be negative, but the confidence is not considered to be sufficient. As is indicated in FIG. 4, the method then proceeds to step 108, increments a counter and goes on to carry out a new monitoring operation in the sequence. When a present negative rate of change of the level can be determined with sufficient confidence, the method instead proceeds to step 109 and provides a signal indicative of detected leakage. The leakage detection system 7 then continues to monitor as is schematically indicated in FIG. 4. According to the example settings used to arrive at the result indicated in FIG. 6, 40 monitoring operations per second were carried out. The monitoring operations may be carried out at a lower or higher frequency and/or irregularly. With a higher monitoring frequency, a reliable leakage detection can be arrived at faster. It should be noted that it is not necessary to determine the above-mentioned confidence, and/or to use a determined confidence as a criterion for the leakage detection. For example, the leakage determination may be carried out for a sufficiently long time that sufficient confidence is always achieved, or the threshold TH may be adjusted to take into account that the level of confidence may vary.

The person skilled in the art realizes that the present invention by no means is limited to the preferred embodiments described above. On the contrary, many modifications and variations are possible within the scope of the appended claims.

The invention claimed is:

1. A method of detecting leakage from a tank containing a product, using a radar level gauge system comprising a transceiver, a propagation device coupled to the transceiver, and processing circuitry coupled to the transceiver, the method comprising the steps of:

performing a sequence of monitoring operations, each monitoring operation including the steps of:
generating, by the transceiver, an electromagnetic transmit signal exhibiting a time-varying frequency;
propagating, by the propagation device, the transmit signal towards a surface of the product in the tank;
returning, by the propagation device, an electromagnetic reflection signal resulting from reflection of the transmit signal at the surface back towards the transceiver;
receiving, by the transceiver, the reflection signal;
forming, by the transceiver, an intermediate frequency signal for the present monitoring operation based on the transmit signal and the reflection signal;
determining, by the processing circuitry, a phase of the intermediate frequency signal for the present monitoring operation;
determining, based on the phase of the intermediate frequency signal for the present monitoring operation and the phase of the intermediate frequency signal associated with at least one previous monitoring operation in the sequence of monitoring operations, a measure indicative of a present rate of change of the phase of the intermediate frequency signals for the sequence of monitoring operations;
comparing the measure indicative of the present rate of change of the phase with a predefined threshold value; and
determining a presence of leakage based on the comparison; and
providing, when it is determined that leakage is present, a signal indicative of detected leakage,
wherein the present rate of change is determined only based on the present monitoring operation, and previous monitoring operations carried out less than five minutes before the present monitoring operation.

2. The method according to claim 1, wherein:
the method further comprises the step of repeatedly acquiring a measure indicative of a rate of change of a temperature at the tank.

3. The method according to claim 2, wherein the determination of the presence of leakage is additionally based on the rate of change of the temperature at the tank.

4. The method according to claim 3, wherein the determination of the presence of leakage is additionally based on the rate of change of the temperature at the tank as a function of time.

5. The method according to claim 1, wherein the determination of the presence of leakage is additionally based on the phase of the intermediate signal as a function of time, or the rate of change of the phase of the intermediate signal as a function of time.

6. The method according to claim 1, wherein the monitoring operations are carried out with an average frequency of at least one monitoring operation per second.

7. A leakage detection system, for detecting leakage from a tank containing a product, the leakage detection system comprising:
a propagation device for propagating an electromagnetic transmit signal towards a surface of the product in the tank, and returning an electromagnetic reflection signal resulting from reflection of the transmit signal at the surface of the product;
a transceiver coupled to the propagation device for generating and providing to the propagation device the transmit signal exhibiting a time-varying frequency, receiving the reflection signal, and mixing the transmit signal and the reflection signal to form an intermediate frequency signal; and processing circuitry, coupled to the transceiver, and configured to:

determine a phase of the intermediate frequency signal formed by the transceiver;

determine, based on the phase of the intermediate frequency signal for a present monitoring operation and the phase of the intermediate frequency signal associated with at least one previous monitoring operation, a measure indicative of a present rate of change of the phase of the intermediate frequency signals for a sequence of monitoring operations;

compare the measure indicative of the present rate of change of the phase with a predefined threshold value;

determine a presence of leakage based on the comparison; and provide, when it is determined that leakage is present, a signal indicative of detected leakage, wherein the processing circuitry is configured to determine the present rate of change only based on the present monitoring operation, and previous monitoring operations carried out less than five minutes before the present monitoring operation.

8. The leakage detection system according to claim 7, wherein:

the leakage detection system further comprises a temperature sensor; and the processing circuitry is configured to repeatedly acquire a measure indicative of a rate of change of a temperature at the tank.

9. The leakage detection system according to claim 8, wherein the processing circuitry is configured to determine the presence of leakage additionally based on the rate of change of the temperature at the tank.

10. The leakage detection system according to claim 9, wherein the processing circuitry is configured to determine the presence of leakage is additionally based on the rate of change of the temperature at the tank as a function of time.

11. The leakage detection system according to claim 1, wherein the processing circuitry is configured to determine the presence of leakage additionally based on the phase of the intermediate signal as a function of time, and/or the rate of change of the phase of the intermediate signal as a function of time.

12. The leakage detection system according to claim 7, wherein the processing circuitry is configured to control the leakage detection system to carry out monitoring operations with an average frequency of at least one monitoring operation per second.

\* \* \* \* \*